Patented Sept. 23, 1952

2,611,784

UNITED STATES PATENT OFFICE 2,611,784

DIALKYL BICYCLO [2.2.1]-5-HEPTENE-2-PHOSPHONATES

Elbert C. Ladd, Passaic, N. J., assignor to United States Rubber Company, New York, N. Y., a corporation of New Jersey No Drawing. Application July 12, 1951, Serial No. 236,461

2 Claims. (Cl. 260—461)

This invention relates to improvements in chemicals.

More particularly, the invention is concerned with novel adducts of dialkyl esters of ethenephosphonic acid and cyclopentadiene. The alkyl groups of the phosphonic esters may be any alkyl groups, for example, methyl, ethyl, propyl, butyl, isopropyl, isobutyl, amyl, hexyl, 2-ethylhexyl, dodecyl.

The formula of the phospho ester is represented by

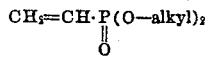

Examples of such are diethyl ethenephosphonate and dibutyl ethenephosphonate.

Reaction is accomplished by mixing the said diene with the ethenephosphonic ester, suitably in a 1:1 or higher molar ratio of ester to diene, and heating to a suitable temperature, for example, 50° C.–250° C., preferably from 100° C.–200° C., until reaction is complete. The reaction may be conducted in a vessel open to the atmosphere, or in a closed system. An autoclave or other pressure reactor is used where either of the reactants has a sufficiently high vapor pressure to make such apparatus desirable or necessary. The reaction usually does not require over 24 hours for completion, and may be complete in 2–16 hours, or even less. The products are separated by concentration in vacuo, steam distillation, fractional distillation, or preferential extraction.

The products are useful in formulation of lube-oil additives for increasing the film strength of lubricating oils, and as plasticizers for plastics including polyvinyl chloride.

The following example illustrates the invention.

*Example*

Fifty-two and one-half (0.32 mole) of diethyl ethenephosphonate and 13.22 gms. (0.2 mole) of cyclopentadiene were placed in a 100 ml. autoclave, which was then closed and heated at 180° C.–185° C., for 16 hours. Filtration of the reaction mixture and subsequent distillation of the filtrate gave 44.5 gms. (96.6% yield) of diethyl bicyclo[2.2.1]-5-heptene-2-phosphonate.

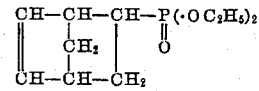

This new compound is a colorless liquid boiling at 88–89°/0.2 mm.; $n_D^{20}=1.4726$.

Analysis: Found: P, 13.70%; (theoretical for $C_{11}H_{19}O_3P$): P, 13.45%.

Having thus described my invention, what I claim and desire to protect by Letters Patent is:

1. A dialkyl bicyclo[2.2.1]-5-heptene-2-phosphonate.
2. Diethyl bicyclo[2.2.1]-5-heptene-2-phosphonate.

ELBERT C. LADD.

No references cited.